United States Patent [19]

Münch

[11] Patent Number: 4,671,678
[45] Date of Patent: Jun. 9, 1987

[54] RESILIENT RADIAL SLIDING BEARING

[75] Inventor: Günter Münch, Damme, Fed. Rep. of Germany

[73] Assignee: Lemforder Metallwaren AG, Fed. Rep. of Germany

[21] Appl. No.: 926,824

[22] Filed: Nov. 3, 1986

Related U.S. Application Data

[63] Continuation of Ser. No. 683,937, Dec. 20, 1984, abandoned.

[30] Foreign Application Priority Data

Dec. 23, 1983 [DE] Fed. Rep. of Germany ....... 3346661

[51] Int. Cl.⁴ ................... F16C 27/06; F16C 33/22; B60G 7/02; F16F 1/38
[52] U.S. Cl. ................... 384/125; 384/222; 384/297; 267/571 R; 267/63 R; 403/225
[58] Field of Search ............ 384/125, 202, 215, 220, 384/222, 291, 297, 286, 29, 37; 403/225-228; 267/57.1 R, 57.1 A, 63 R, 63 A, 141.2, 141.3, 152, 153; 280/695, 671, 673, 716, 717

[56] References Cited

U.S. PATENT DOCUMENTS

| | | | |
|---|---|---|---|
| 3,039,831 | 6/1962 | Thomas | 384/222 |
| 3,075,786 | 1/1963 | Freers et al. | 403/227 X |
| 3,107,953 | 10/1963 | Palm | 384/153 |
| 3,494,676 | 2/1970 | Compton | 384/222 |
| 3,781,073 | 12/1973 | Jörn et al. | 384/291 |

FOREIGN PATENT DOCUMENTS 229080 11/1958 Australia ............. 384/286

*Primary Examiner*—Stuart S. Levy
*Assistant Examiner*—David Werner
*Attorney, Agent, or Firm*—McGlew and Tuttle

[57] ABSTRACT

A resilient radial sliding bearing is intended for connecting parts, particularly motor vehicle parts which perform oscillatory movements relative to each other. The bearing comprises a resilient body of elastic material, having a slide surface which is provided with recesses for a lubricant and cooperates in rotary motion as well as, within limits, axially sliding motion, with an opposite surface of a sliding sleeve. A mounting for the bearing comprises a sleeve member having downturned edges which engages over the sliding sleeve and each end of the resilient body and limits the axial sliding movement of the resilient body to a defined clearance.

8 Claims, 3 Drawing Figures

RESILIENT RADIAL SLIDING BEARING

This application is a continuation of application Ser. No. 683,937, filed Dec. 20, 1984 now abandoned.

FIELD AND BACKGROUND OF THE INVENTION

This invention relates in general to bearing constructions and in particular to a new useful radial sliding bearing which includes a resilient annular sleeve body of an elastic material bonded to one of the parts to be flexibly linked together which has an outer circumferential slide surface engaging a sliding sleeve and limits the axial movement of the resilient body.

Radial sliding bearings of this kind are known from German OS No. 20 29 901 and 23 62 504. Such bearings are employed primarily for suspending wheels, in order to permit oscillatory rotary movements of the parts connected through the bearing while reducing the torsional moment and provide radial damping with a small spring rate. This is obtained by a resilient body of rubber or another elastomer. To adjust to the occurring load, this resilient body must be sufficiently large, i.e. have an adjusted spring rate. To improve the sought effect, chiefly a supporting tube is embedded in the resilient body, so that this supporting tube is coated with elastic material both outside and inside. The elastic material outside and inside may be unequally resilient (German OS No. 23 62 504). A small torsional moment during the rotary motion is obtained, according to German OS No. 20 59 901, by means of recesses which are provided on the slide surface of the resilient body and filled with a permanent lubricant. Axial movements between the resilient body and the sliding sleeve are prevented in this and other prior art designs, such as according to German OS No. 15 25 041. The movement is prevented by radial flanges on one of the parts, which apply against circular shoulders of the other part. Such a resilient sliding bearing requires accurate dimensioning and small mounting tolerances, especially if large angular deflections are to be admitted without affecting the life of the bearing.

SUMMARY OF THE INVENTION

The invention is directed to a bearing ensuring that assembly tolerances are compensated within limits without unfavorably affecting the function of the bearing, and without the manufacture becoming more expensive.

In accordance with the invention a resilient radial sliding bearing for two motor vehicle parts flexibly linked together and executing oscillatory movements comprises a resilient body of an elastic material bonded to one of the parts and mounted to apply by its circumferential slide surface which is provided with recesses for a lubricant against an opposite surface of a sliding sleeve which is connected to the other part. The resilient body is mounted to be axially movable relative to the sliding sleeve within a defined clearance.

The bearing with the features of the invention has relatively small overall dimensions, but a satisfactbrily large resilient body which is effective primarily as a damping element for radial loads. Sufficiently large supporting and sliding surfaces make sure that the torsional moment remains small, with a soft, damping radial resilience. What is substantial however, is the advantageous clearance for the axial movement of one of the parts relative to the other, so that larger assembly tolerances can be provided without thereby unfavorably affecting the required properties of the bearing.

Accordingly it is an object of the invention to provide an improved resilient radial sliding bearing for two parts particularly motor vehicle parts which are flexibly linked together.

A further object of the invention is to provide a resilient radial sliding bearing which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
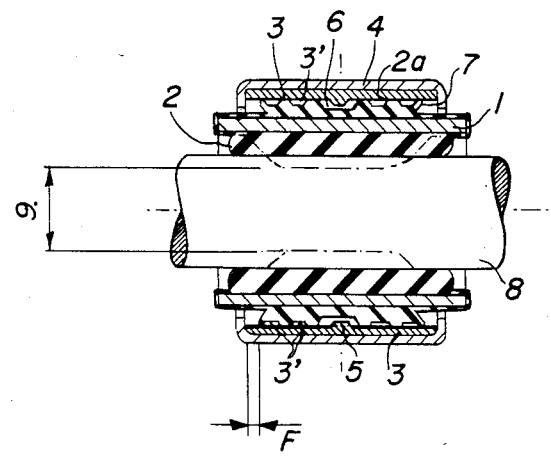
FIG. 1 is a sectional view in the axial plane of a bearing constructed in accordance with the invention.

Referring to the drawings in particular the invention embodied therein comprises a radial sliding bearing with two parts which, in the embodiment shown in FIG. 1, includes a pin or a shaft part 8 which is mounted for connection through an outer tube 4 to another part particularly of motor vehicles wherein the parts execute oscillatory movements. In accordance with the invention the resilient annular sleeve body of an elastic material is bonded to one of the vehicle parts and has an outer circumferential slide surface 2a which has a plurality of axially spaced apart circumferentially extending lubricating receiving recesses 3' defined between annular lip portions 7 defined thereon. The sliding sleeve 3 is disposed around and is in engagement with the slide surface 2a and it is connected to the other of the parts through the outer tube 4. The outer tube 4 comprises mounting means mounting the resilient member 2 in respect to the sliding sleeve 3, and which permits axial movement of the resilient body 2 within a defined clearance F.

In all the embodiments, a supporting tube 1 is embedded in a body 2 of a resilient material, so that the tube 1 is coated both outside and inside with an elastomer. Resilient body 2 is provided on its outer circumference with recesses 3' which are filled with a lubricant. According to FIG. 1, resilient body 2 is received in slide sleeve 3 which is retained in outer tube 1. The slide surface of sleeve 3 is longer than the slide surface on the circumference of resilient body 2, so that the resilient body is axially movable within the sleeve 3.

A safety against losing permits an assemblage of the bearing before shipping and prevents disassembage of the bearing before mounting. This safety comprises, in the shown design, a supporting rib 5 provided on the inner circumference of sleeve 3 and engaging a circular recess 6 on the outer circumference of resilient body 2. Recess 6 is wider by the desired axial play of resilient body 2 in sleeve 3 than the width of rib 5. On the ends of the slide surface of resilient body 2, sealing lips 7 are provided in the embodiment of FIG. 1. These lips, however, may be omitted for smaller loads, especially if flanges of the outer tube 4 extend at the ends close to the outer surface of the supporting body and thus secure the sliding sleeve 3. For assemblage, outer tube 4 is inserted in a bearing eye of one of the parts, while the hollow of resilient body 2 is engaged, under resilient deformation inside, onto a pin, a shaft 8, or the like of the other part. The resilient body 2 becomes deformed from its initial outline indicated by broken lines 9, into its shape indicated by solid lines. In the embodiment of FIG. 1, resilient body 2 is axially movable from its central position to both sides by a distance F.

Figure 2:
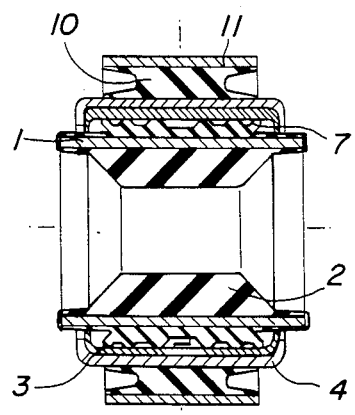
FIG. 2 is a similar view of another embodiment.

The embodiment of FIG. 2 substantially corresponds to that of FIG. 1. The bearing is shown in its shape before assemblage in a vehicle. The difference is that the safety against losing is formed by inwardly extending radial end flanges of the sliding sleeve 3, which cooperate with circular shoulders of resilient body 2 or with sealing lips 7 provided at the ends thereof. It is further shown that outer tube 4 may be bonded by its outer circumference to another annular body 10 which is inserted in an outer receiving tube 11 to which it also may be firmly bonded. The resilient body 2 inside determines the damping, resilience, and due to its stressed state, the oriented positioning fit on a shaft, for example. For endurance strength reasons, it should be more resilient in the radial direction than outer resilient annular body 10. This can be obtained in various ways, for example by providing the resilient body 2 with a cylindrical cross section, by designing the annular body 10 with a varying outline, by selecting, for resilient body 2 and annular body 10, materials having an unequal elasticity, or, with the same elastic material, by providing unequal shore hardnesses for the two bodies 2 and 2. The shape of annular body 10 may be varied by frontal recesses on the two sides, as shown in FIG. 2. Such a shape of body 10 permits larger deformations at a cardanic tilting relative to resilient body 2. For larger tilting of this kind, the hollow of receiving tube 11 may be flaring at its two ends, or even from its center to both sides. FIG. 2 shows in addition the design of sliding sleeve 3 in two parts with a central snap-action connection.

Figure 3:
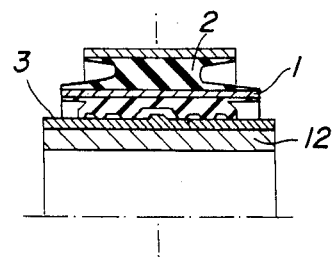
FIG. 3 is a similar view of still another embodiment.

FIG. 3 shows an embodiment in which an arrangement of FIG. 2 is inverted. Resilient body 2 is connectable with the outer bearing part, while sliding sleeve 3 is carried on a supporting tube, a shaft 12, etc. The safety against losing i.e. holding of the two parts 2 and 3 together during transportation, is again formed by a supporting rib 5 on the outer circumference of sleeve 3, engaging a wide circular groove 6 on the outer circumference of the resilient body 2, as according to FIG. 1. The other specific features of FIGS. 1 and 2 also apply in this embodiment.

While specific embodiments of the invention have been shown and described in detail to illustrate the application of the principles of the invention, it will be understood that the invention may be embodied otherwise without departing from such principles.

What is claimed is:

1. A resilient radial sliding bearing for two parts, which may be made with varying tolerances, flexibly linked together for executing oscillatory movements, comprising a resilient annular sleeve body having a supporting tube embedded in a body of resilient material so that the tube is coated inside and outside with an elastomer, the said sleeve body being bonded to one of said parts and having a circumferential slide surface with a plurality of spaced-apart lubricant receiving recesses defined along its axial length, a sliding sleeve disposed around and in engagement with said slide surface on the circumference of the resilient body, said sliding sleeve being connected to the other of the parts, and mounting means for mounting said resilient body and said sliding sleeve, the mounting means being designed so that the slide surface of the sliding sleeve is longer than the slide surface on the circumference of the resilient body so that the resilient body is axially movable within the sliding sleeve so the bearing may accept parts with different tolerances or sizes without distortion of the resilient material when the bearing is at rest.

2. A resilient radial sliding bearing according to claim 1, wherein said sliding sleeve and said resilient body includes therebetween a radially projecting portion engaging in a radially recessed portion which limit the axial movement of said sliding relative to said resilient body.

3. A resilient radial sliding bearing according to claim 2, wherein said sleeve includes a radially projecting rib and said resilient body includes a radially formed groove into which said rib projects which has a width exceeding the axial width of said rib.

4. A resilient radial sliding bearing according to claim 1 wherein said resilient body includes ends having projecting sealing lips which apply against each side of said sliding sleeve and forming said mounting means.

5. A resilient radial sliding bearing according to claim 1, wherein said sliding sleeve is provided with an inwardly protruding stop flange at each end limiting the axial movement of said resilient body and forming said mounting means.

6. A resilient radial sliding bearing according to claim 1, wherein said mounting means comprises an outer tubular member and said outer tubular member and said sliding sleeve has downturned end portions at each end forming sealing ends engaged against each end of said resilient body.

7. resilient radial sliding bearing according to claim 6, including a supporting tube formed within said resilient body and extending axially therethrough, said outer tubular member having downturned ends limiting the axial movement of the outer portion of said resilient body which extends beyond said supporting tube.

8. A resilient radial sliding bearing according to claim 1, wherein said mounting means includes an outer tubular member having downturned ends at each end forming flanges which together with downturned ends of said sliding sleeve limit the axial movement of said resilient body and including a second outer tube arranged around said outer tube and including a resilient band portion joining said second outer tube to said outer tube.

* * * * *